(12) United States Patent
Aynie et al.

(10) Patent No.: US 6,454,447 B1
(45) Date of Patent: Sep. 24, 2002

(54) DOUBLE REFLECTION INDICATOR LIGHT

(75) Inventors: Jean-Pierre Aynie; Benoist Fleury; Miguel Nguyên Van, all of Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 09/671,467

(22) Filed: Sep. 27, 2000

(30) Foreign Application Priority Data

Sep. 27, 1999 (FR) .............................................. 99 11993

(51) Int. Cl.$^7$ ................................................. B60Q 1/00
(52) U.S. Cl. ........................ 362/488; 362/517; 362/518; 362/309; 362/217; 362/245; 362/247; 362/297; 362/298; 362/299; 362/223
(58) Field of Search ................................. 362/517, 518, 362/247, 245, 346, 348, 297, 298, 217, 219–225, 299, 309, 308

(56) References Cited

U.S. PATENT DOCUMENTS

| | | | |
|---|---|---|---|
| 4,481,563 A | * | 11/1984 | Snyder et al. ............... 362/296 |
| 4,855,885 A | | 8/1989 | MacEachern et al. ........ 362/288 |
| 5,303,126 A | * | 4/1994 | Taniuchi ...................... 362/61 |

FOREIGN PATENT DOCUMENTS

FR 2 576 566 8/1996

OTHER PUBLICATIONS

French Search Report dated May 23, 2000.

* cited by examiner

*Primary Examiner*—Stephen Husar
*Assistant Examiner*—Bertrand Zeade
(74) *Attorney, Agent, or Firm*—Morgan & Finnegan, LLP (57) ABSTRACT

A motor vehicle indicator light has an elongate light source, highly inclined with respect to a required beam spread direction and a reflector in which the source is mounted. The reflector includes a mirror able to create, from part of the source situated opposite it, a primary virtual light source parallel to the required direction of spread and means for concentrating the light radiation coming from the said primary virtual source in the vicinity of a plane containing the required beam spread direction.

18 Claims, 9 Drawing Sheets

FIG. 1

FIG_2a

FIG_2b

FIG_4a

FIG_3a

FIG_5

FIG_7

FIG_8

FIG_9

DOUBLE REFLECTION INDICATOR LIGHT

FIELD OF THE INVENTION

The present invention concerns indicator lights for motor vehicles. More precisely, the invention concerns a light comprising a light source with an elongate shape overall and means for directing the radiation from the light towards the outside of the vehicle in accordance with a photometry in accordance with the regulations.

BACKGROUND OF THE INVENTION

A constraint inherent in the design of indicator lights is compliance with the legally required photometry. The photometry is determined by the measurement of the light intensity intercepted by a screen placed opposite the light at a given distance facing it, and disposed transversely to the longitudinal axis of the vehicle.

The regulatory provisions thus impose minimum levels of intensity to be complied with:

- at a point situated at the centre of the photometric grid (on the axis of the light),
- and at points distributed around this centre. It is in particular necessary to comply with the minimum levels of intensity in a horizontal band extending on each side of the centre of the grid, so that an observer observing the light at different lateral angles whilst remaining substantially in the same horizontal plane can perceive the radiation issuing from the light. In order to comply with this second requirement it is therefore necessary to horizontally spread the beam generated by the light.

Thus, in order to comply with the legal constraints (and in order to produce light delivering an effective indicating beam), the illumination of the indicator lights must both be directed substantially in a direction parallel to the longitudinal axis thereof and have a sufficient horizontal spread (displayed by isocandela distributions on the photometry grid), and a certain, more moderate, vertical spread.

Moreover, designers are currently seeking to use sources with an elongate shape, of large size, such as low-pressure discharge lamps. These sources would be advantageous because of their low power consumption, and because of the possibilities which they offer in terms of style.

However, one problem posed by the use of such elongate light sources is satisfying the legal photometric minima, given that, at a given flux, the luminance of a source is smaller, the more extensive its surface.

In association with a rectilinear light source having great elongation, the use of a reflector in the shape of a cylinder with a parabolic base (or cylindro-parabolic reflector), whose focal line coincides with the axis of the source, could make it possible to maximise the intensity of the emission of a substantially parallel beam in order to resolve the aforementioned problem. The radiation emitted by such an optical assembly would be characterised by a high spread along the axis of the elongate source.

In the case of a source whose axis is horizontal and included in a transverse direction of the vehicle, it is thus possible to envisage obtaining a photometry in compliance with the regulations by using a cylindro-parabolic reflector.

However, in the case of an elongate light source whose axis is oriented differently, in a substantially vertical fashion, for example, additional means should also be provided for spreading the beam of the light (which is already spread significantly along the axis of the source, that is to say vertically), in the horizontal direction. These additional spreading means could be vertical cylindrical patterns (or flutes) provided on the reflector, a lens or a glass closing off the light.

A photometric grid would then be obtained which is highly dispersed because of this double spread, and a significant proportion of the flux generated by the light would be directed in directions which correspond neither to angles of observation nor to measurement points on the photometric grid in accordance with the regulations. Because of this, this significant proportion of the flux would be "lost" and it would be necessary to oversize the light source (increasing the total intensity delivered by the source) in order to comply with the minimum intensity constraints at the centre of the grid. Such an oversizing would result in additional costs which would increase the cost price of the light, in an increase in the electrical power consumed, and in obvious problems of bulk.

One aim of the invention is to make it possible to produce a light comprising an elongate-shaped light source oriented in any manner with respect to the horizontal, producing a photometry beam in accordance with the regulations without requiring any oversizing of the source compared with a light whose similar source is oriented horizontally.

SUMMARY OF THE INVENTION

According to the present invention there is provided a motor vehicle indicator light comprising a light source of generally elongate shape, highly inclined with respect to a required beam spread direction, and a reflector in which the source is mounted, wherein the reflector comprises at least one mirror able to create, from a part of the source situated opposite it, a primary virtual light source substantially parallel to the required spread direction and means for concentrating the light radiation coming from the said primary virtual source in the vicinity of a plane containing the required beam spread direction.

Preferred but non-limitative aspects of the device according to the invention are as follows:

- a series of optical cells each situated opposite a part of the light source, each cell comprising at least one mirror for creating a primary virtual light source substantially parallel to the required direction of spread and means for concentrating the light radiation coming from the said primary virtual source in the vicinity of a plane containing the required beam spread direction,
- the means for concentrating the light radiation coming from the primary virtual source of an optical cell lie overlapping, in a required direction of emission (X) of the light, at least one mirror intended to create a primary virtual light source of the cell which is adjacent to it,
- it comprises a reflective cover associated with the light source,
- the reflector lies essentially on one side of the light source,
- the light source is a low-pressure discharge tube, whose axis is separate from the vertical in a longitudinal vertical plane and/or in a transverse vertical plane,
- the mirror or mirrors are disposed perpendicularly to the bisecting line of the axis of the part of the light source situated opposite the mirror or mirrors, and of an axis parallel to the required direction of spread,
- the concentration means comprise a part of a reflective surface in the form of a parabolic cylinder whose focal line coincides substantially with the axis of the primary virtual source, the concentration means comprise, in continuity with the part of a reflective surface in the form of a parabolic cylinder, a reflective surface having substantially the geometry of a semi-paraboloid, the two reflective surfaces being in continuity with each other, the focal point of the semi-paraboloid corresponding substantially to one end of the primary virtual source, the concentration means comprise an essentially flat reflective surface for creating, from the primary virtual source, a secondary virtual source which is parallel to it, and means for rectifying the radiation reflected by the said essentially flat reflective surface, the reflective surfaces of the reflector consist of separation surfaces between a solid material in which the source is embedded and the environment external to the light, the refractive index of the material filling the light being greater than the refractive index of the environment external to the light and the face of the light through which the light radiation emerges from the light being defined by a separation surface, the means of rectifying the radiation are integrated into the separation surface, the mirrors for forming a primary virtual source are plane, the surfaces of the mirrors comprises means of spreading the light perpendicularly to the required principal beam spread direction (Y), the said spreading means are serrations which extend generally parallel to the required principal beam spread direction (Y), the mirrors for forming a primary virtual source are portions of a circular cylinder whose directrix extends parallel to the required principal beam spread direction (Y).

BRIEF DESCRIPTION OF THE DRAWINGS

Other aspects and advantages of the invention will emerge more clearly from the following description of exemplary preferred embodiments of the invention given with reference to the accompanying drawings, in which.

DESCRIPTION OF THE PREFERRED EMBODIMENTS

In the various figures, like reference numerals refer to like parts.

Figure 1:
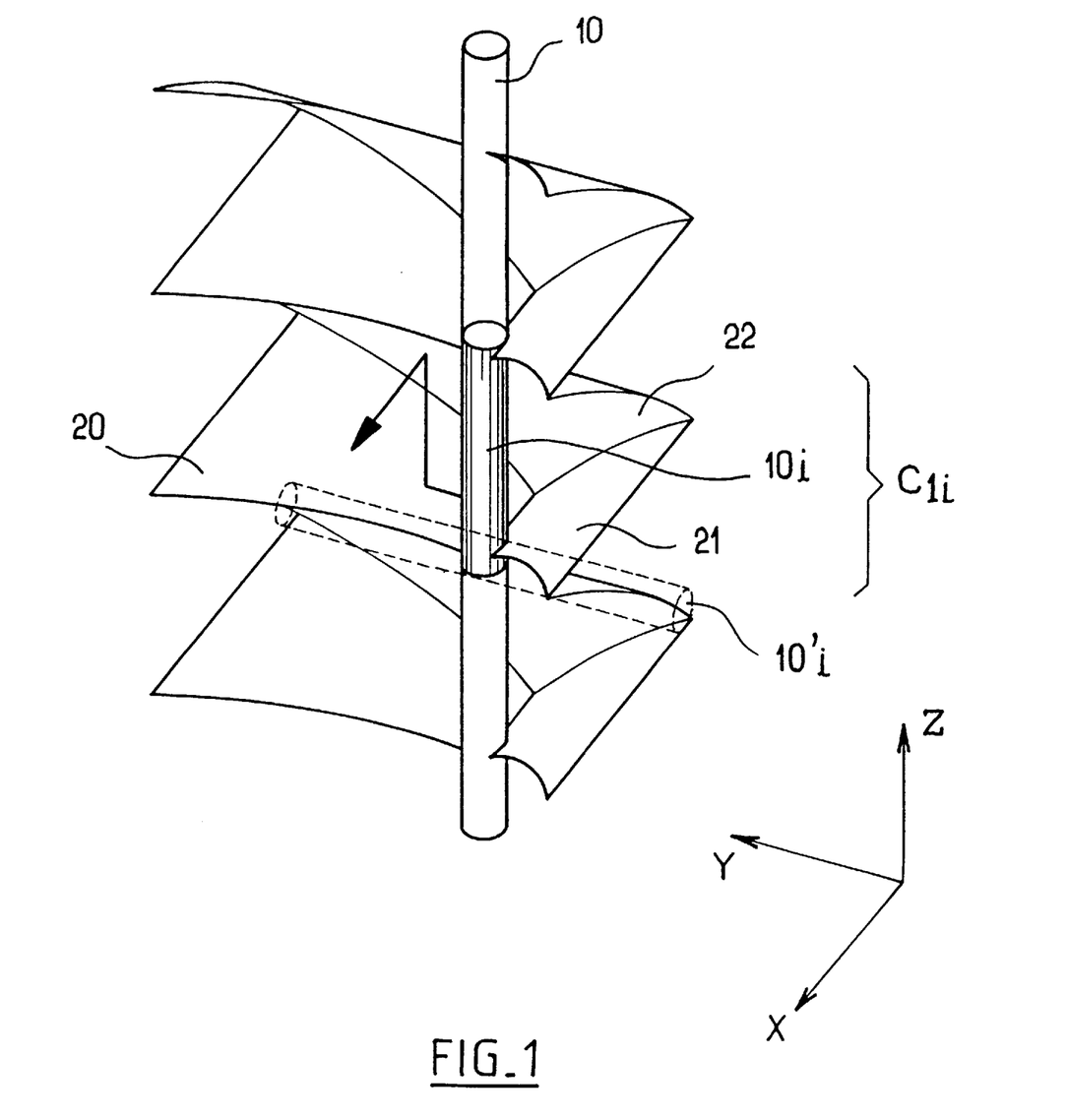
FIG. 1 is an outline diagram in perspective showing the light source and the reflector of an indicator light according to the invention.

With reference first of all to FIG. 1, a light F1 comprises a superimposition, in a vertical direction Z, of elementary cells $C_{1i}$ each fulfilling the same function.

The light F1 comprises an elongate light source 10, rectilinear in the present embodiment. The source 10 is also vertical. The source 10 can be a low-pressure discharge tube with volume or surface emission.

Each cell $C_{1i}$ has reflective elements, whose structure and function will be detailed below, and a portion $10_i$ of the light source 10 which is situated opposite the said reflective elements.

The reflective elements of each cell comprise two plane reflective surfaces 20 and 21 which both extend parallel to the axis X corresponding to the principal direction of emission of the light (and in the present case to the longitudinal axis of the vehicle), the two reflective planes 20 and 21 also being inclined by 45° on each side of the vertical Z so as to form a right angle between them.

Each cell $C_{1i}$ comprises a third reflective surface 22 whose geometry is that of a portion of a parabolic cylinder whose focal axis is horizontal and transverse to the direction X. This focal axis is situated, in the direction X, substantially at the middle of the source 10.

The three reflective surfaces 20, 21, 22 of each cell $C_{1i}$ are arranged with each other so as to form a reflective surface in a single piece opposite the light source portion $10_i$. These reflective surfaces can be made in one piece by moulding from a synthetic material which is then covered with a reflective coating (for example by vacuum metallisation).

In the embodiment depicted in FIG. 1, the plane surfaces 20 and 21 are situated in the bottom part of the cell $C_{1i}$ whilst the cylindro-parabolic surface 22 occupies the top part of the cell; it is possible, according to the invention, to reverse this configuration by placing the plane surfaces 20 and 21 in the top part of the cell, their reflective surfaces then being turned downwards in order to be, as in the embodiment in FIG. 1, situated opposite each other.

A significant part of the radiation issuing from a light source portion $10_i$ is reflected by one of the two associated reflective plane surfaces 20, 21. These reflective surfaces 20, 21 thus form a virtual light source $10'_i$ from the light source portion.

It will be understood that this virtual source $10'_i$ has the form of an elongate light bar oriented parallel to the horizontal transverse direction Y, and that thus the focal line of the cylindro-parabolic surface 22 coincides with the axis of the virtual source $10'_i$ formed by the reflective planes 20 and 21 of the cell.

Thus the light rays issuing from the source portion 10 and reflected by one or other of these two reflective planes 20, 21 are next reflected by the cylindroparabolic part 22 as a substantially parallel beam spread mainly in the horizontal direction.

More precisely, the surface 22 will form images of the virtual source $10'_i$ which will all be oriented generally horizontally, so that the horizontal spread of the beam will be given by the length of the source $10_i$, whilst its vertical spread will be given by the diameter of the said source $10'_i$.

Figure 2A:
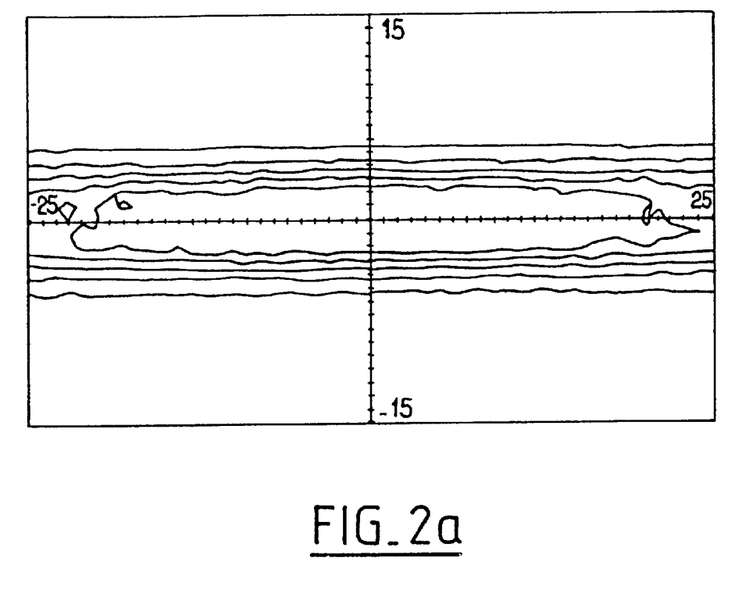
FIGS. 2a and 2b show the appearance of the beam emitted by the light of FIG. 1, for two respective embodiments of the said light.
Figure 2B:
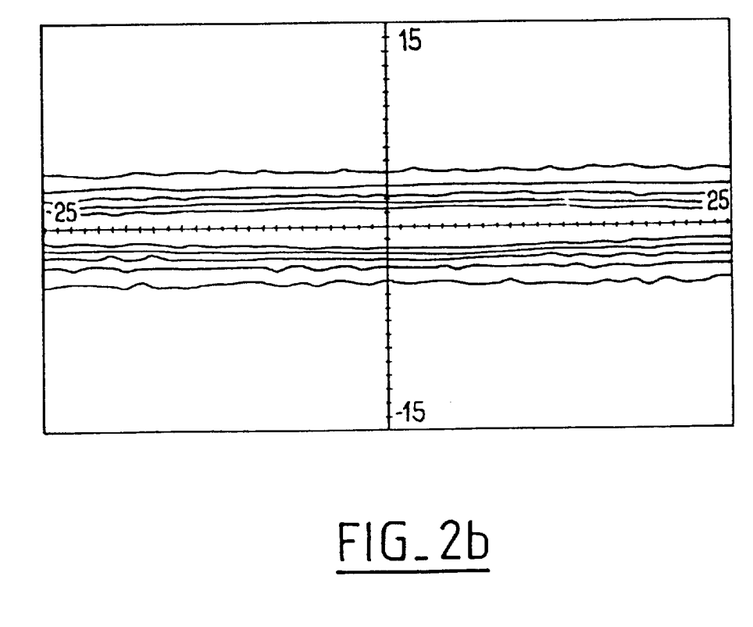

FIGS. 2a and 2b show respectively the appearance of the isocandelas obtained by interception of the beam emitted by a light according to the invention using a light source 10 either of the volume type (a tube filled with a gas such as neon, functioning by electrical discharge), or of the surface type (the tube is also filled with neon, and a fluorescent powder is also deposited on the surface of the tube. The two beams have the same general appearance: they correspond to the superimposition of the beams of the elementary cells $C_{1i}$ of the light F1, the respective beams emitted by the different cells being substantially identical.

It can be seen that:
- the isocandelas are concentrated in a horizontal median region, so that the beam issuing from the light is concentrated on the central region of the grid for which it is sought to satisfy the minimum lighting constraints established by the regulations, and
- the illumination of the beam is substantially constant when the lateral observation angle is varied for the same vertical position. This second characteristic ensures that an observer moving in a horizontal plane so that his lateral observation angle varies (here between −25° and +25°) always clearly perceives the beam issuing from the light.

The slight difference in distribution of the isocandelas on the sides of the two grids in FIGS. 2a and 2b is due to the construction of the light sources 10, the luminance of the surface source not varying with the lateral observation angle (FIG. 2b), whilst it decreases slightly on the lateral edges of the grid 2a, which corresponds to a volume light source 10.

Thus it is possible according to the invention to recover the flux issuing from an elongate light source extending in a generally vertical orientation in order to form a beam as depicted in FIGS. 2a and 2b, spread principally in the horizontal direction.

Figure 3A:
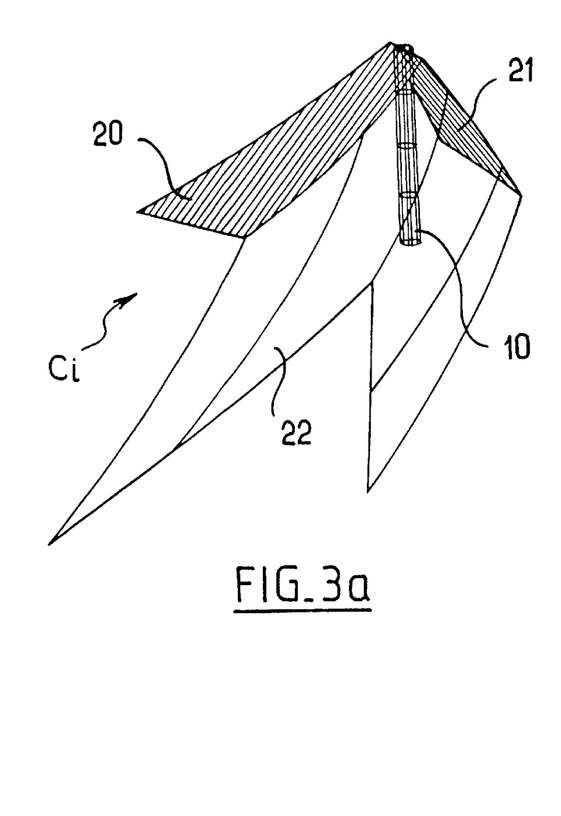
FIGS. 3a and 3b are two schematic representations in perspective of two particular embodiments of an optical cell of a light according to the invention.

With reference to FIG. 3a, a particular embodiment of an optical cell $C_i$ has been depicted, in which the surfaces of the plane mirrors 20 and 21 carry cylindrical serrations extending parallel to the horizontal transverse axis Y relating to the vehicle. These serrations can have a semi-circular convex section; their role is to constitute, from the radiation of the source 10, a virtual source which is not concentrated on the focal axis of the reflective surface 22, but on the contrary spread vertically.

Figure 4A:
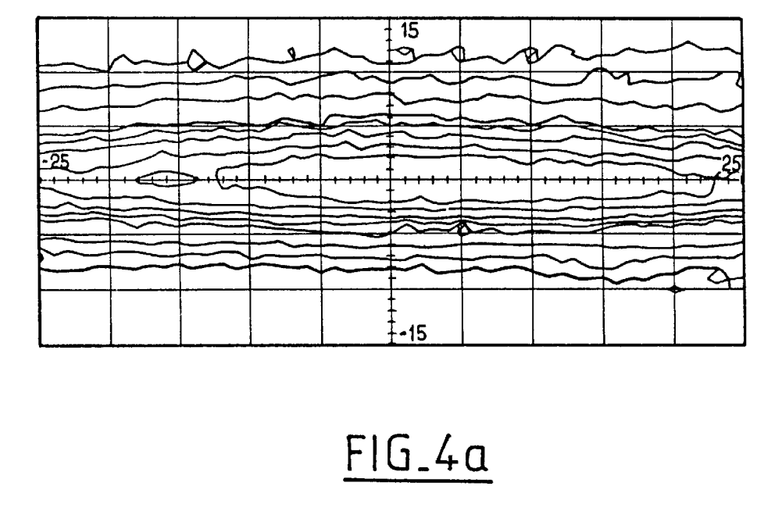
FIGS. 4a and 4b show the appearance of the beam emitted by lights using cells as depicted in FIGS. 3a and 3b, respectively.

In this way, the cell $C_i$ emits a radiation whose spread in the vertical direction is greater than the spread of the configuration in which the surfaces 20 and 21 are strictly plane, as depicted in FIG. 4a.

Figure 3B:
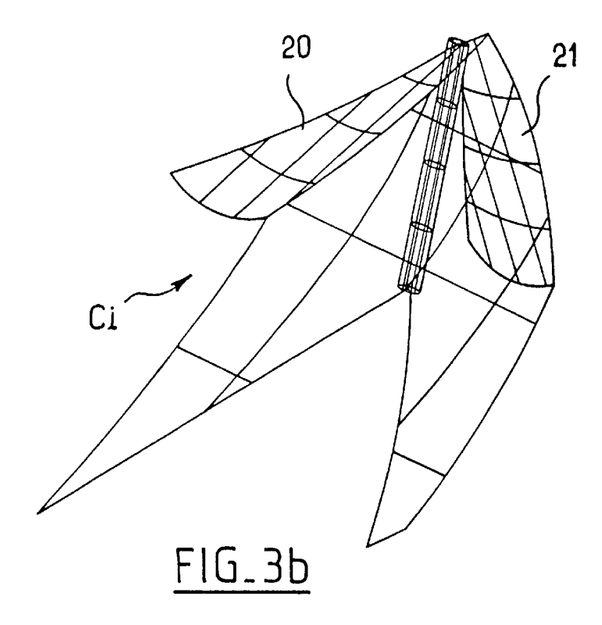
Figure 4B:
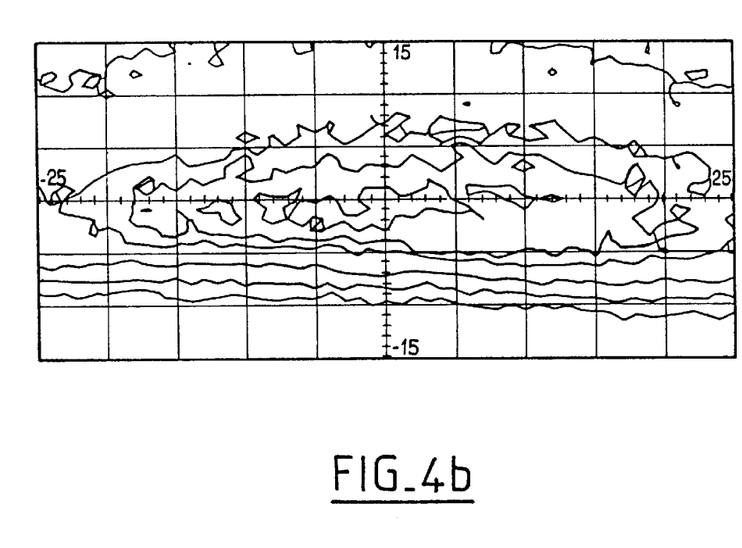

To fulfil this function of vertical spread of the light reflected by the reflected surfaces 20 and 21, it is also possible to give these surfaces the geometry of a portion of a cylinder with a circular base, the directrix of these cylinders being parallel to the axis Y. This configuration is depicted in FIG. 3b. In this case too, there is obtained in emission from the cell $C_i$ a spread in the vertical direction, as depicted in FIG. 4b.

Figure 5:
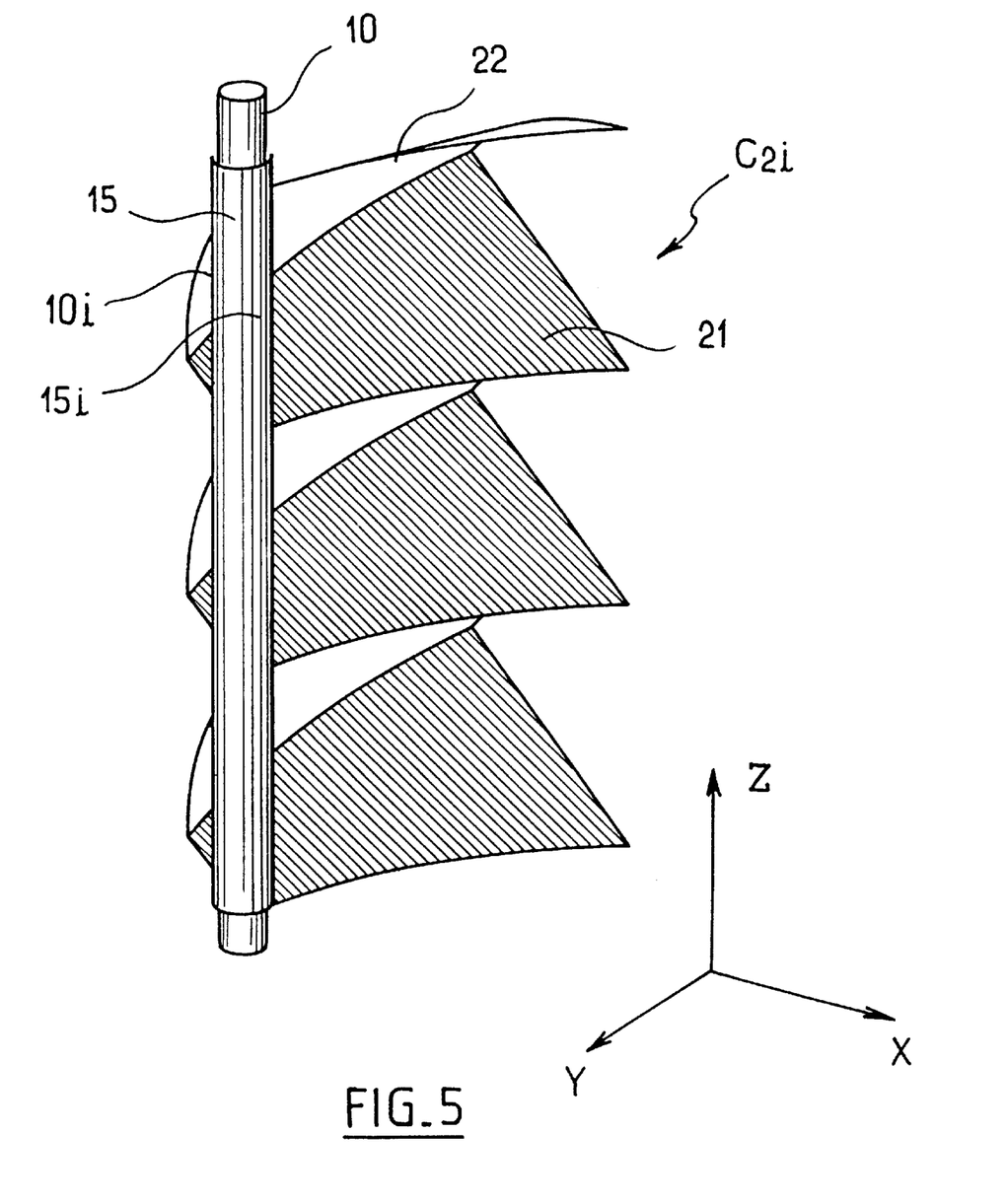
FIG. 5 is a schematic representation in perspective of a first variant embodiment of a light according to the invention.

FIG. 5 depicts a variant of the invention in which the tube 10 of the light source is hidden from the direct vision of an observer by an opaque semi-cylinder coaxial with the tube, and whose reflective internal face, turned towards the tube, forms an image of the tube 10 on the tube itself or close to it, depending on whether the tube 10 is a surface or volume light source.

In addition, in the variant embodiment depicted in FIG. 5, only a lateral half of the reflective elements of the cells making up the light has been kept: each cell $C_{2i}$ is thus composed of the source portion $10_i$ and the association cylinder portion $15_i$, and a single plane mirror 21 similar to the mirror 21 in FIG. 1 and a reflective surface 22 whose geometry is that of a part of a cylindro-parabolic surface whose focal axis coincides here too with the axis of the virtual image created by the plane mirror 21 from the source portion $10_i$. In this case, the reflective surfaces 21 and 22 both lie solely on the same side of the light source in the transverse plane XY.

Figure 6A:
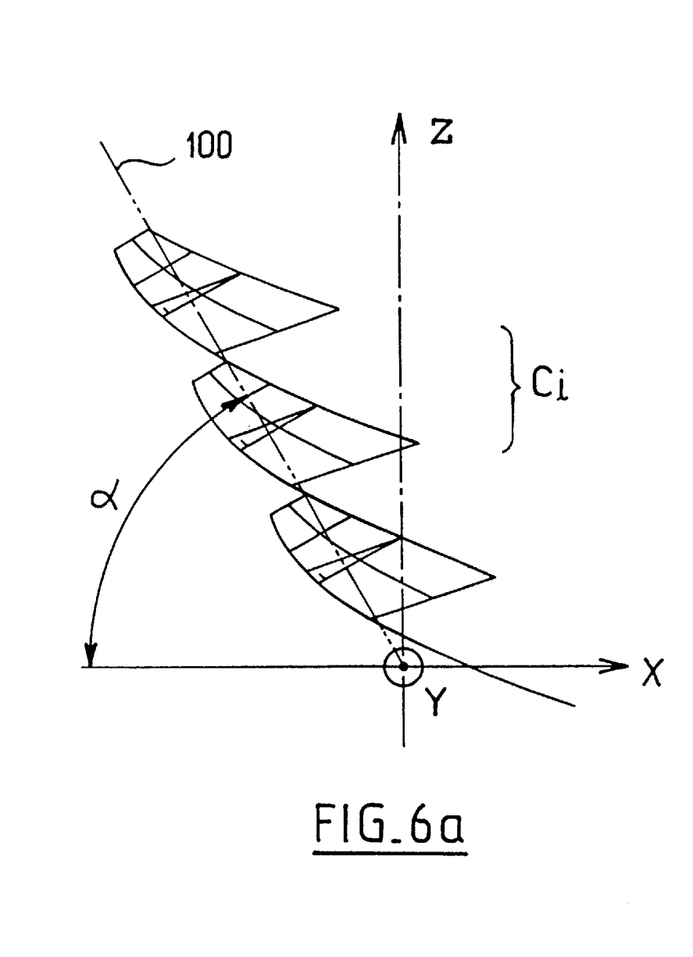
FIGS. 6a and 6b are two schematic representations, in plan view, of the arrangement of the reflective elements of a light according to the invention when the axis of the elongate light source is not strictly vertical.

As described above, the light source can be oriented vertically. It is also possible, according to the invention, to give the light source any orientation in space:
- on the one hand, it is possible according to the invention to give to the axis 100 of the light source an inclination a with respect to the horizontal in the longitudinal plane XZ which is different from 90°. This configuration is depicted in FIG. 6a. In this case, the plane reflectors 20 and 21 are oriented so as to be normal to the bisectors of the axis 100 of the tube and of the transverse horizontal axis Y, and the different cells $C_i$ are aligned along the axis 100 of the light source.

Figure 6B:
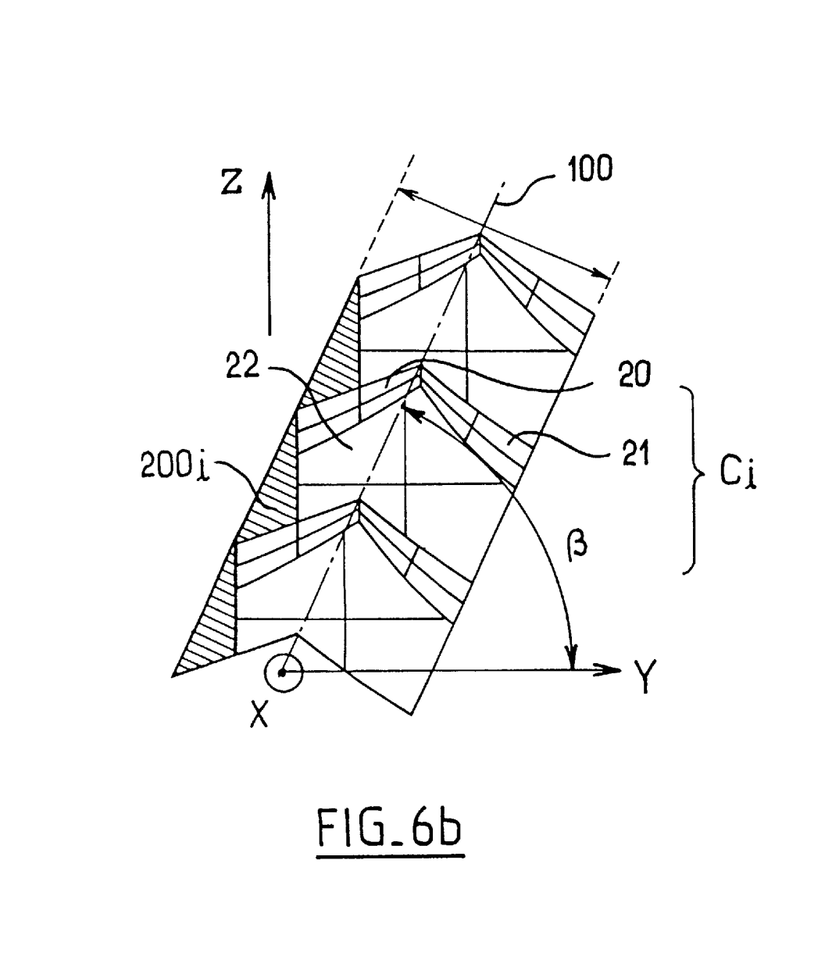
Figure 7:
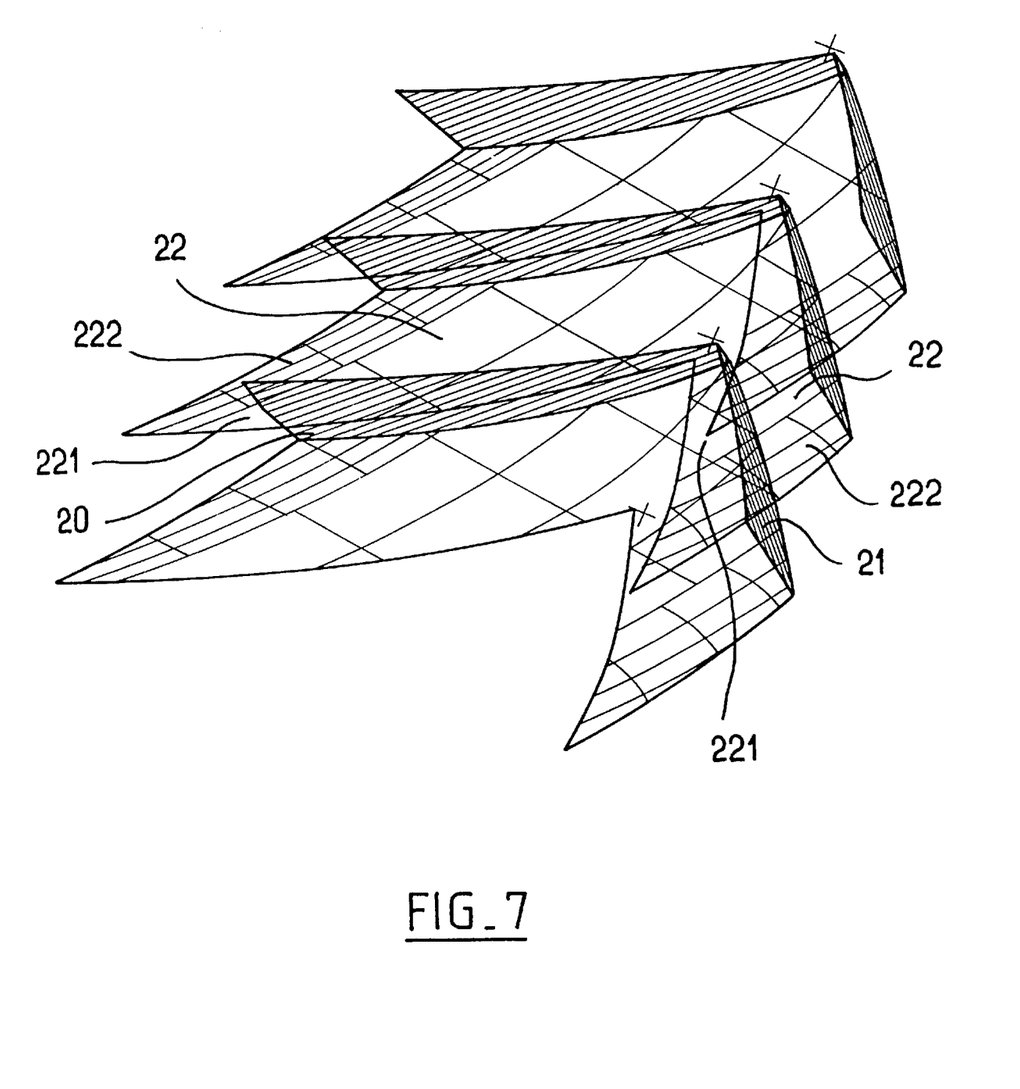
FIG. 7 is a schematic representation in perspective of a second variant embodiment of a light reflector according to the invention.

It should be noted that, if the angle a is different from 90°, the surface of the reflectors 20 and 21 is visible to an observer looking at the light parallel to the axis X, whilst with an angle a equal to 90° only the thickness of these reflectors is visible to such an observer. Thus, for an angle a different from 90° and when the light is switched on, the surfaces of the reflectors 20 and 21 send substantially no light radiation in the required emission direction X and these surfaces appear as dark areas, constituting optical discontinuity elements. In order to remedy this drawback, the reflective surfaces 22 of each cell can be extended so as to straddle the reflectors 20 and 21 of the adjacent cell in order to be situated opposite these reflectors in the horizontal direction, and to exhibit a luminous surface to an observer. FIG. 7 depicts such a configuration, in which the reflective surfaces 22 are extended by parts 221 extending downwards as far as the lower limits of the surfaces 20 and 21, which they overhang,
- on the other hand, as depicted in FIG. 6b, the axis 100 of the light source can be inclined in the transverse plane YZ by an angle β different from 90° with respect to the horizontal. Here too, the different cells $C_i$ are aligned along the axis 100 of the light source. Naturally, it is possible according to the invention to move the axis of the light source 10 away from the vertical simultaneously in the planes XZ and YZ (α and β both different from 90°.

It should be noted that, in the configuration in FIG. 6b, when the reflective elements of the reflector lie on both sides of the light source and are limited laterally by planes parallel to the axis 100 of the source, it may be difficult to ensure uniform illumination of the reflective surface of the reflector.

This is because the horizontal virtual source obtained by means of the plane reflective surfaces 20 and 21, which are oriented so as to be normal to the bisector of the axis 100 of the source and of the transverse horizontal axis Y, will be situated so as to be offset horizontally in the lateral direction with respect to the associated cylindro-parabolic reflector portion 22: observation of the light will thus reveal shadow areas $200_i$ on the sides of the reflector.

In order to eliminate the major part of such shadow areas $200_i$, it is possible, as depicted in FIG. 7, to interrupt the cylindro-parabolic surfaces 22 on both sides, opposite the ends of the virtual light sources created by the reflectors 20 and 21, and to extend these surfaces 22 by means of reflective semi-paraboloids 222 with an identical focal length, situated so as to be continuous with them, the foci of these semi-paraboloids being positioned on the lateral ends of the virtual light sources of the cell.

In the case where the axis of the source is thus inclined in the transverse plane YZ with respect to the vertical, it is also possible advantageously to use a "semi-system" comprising, as in the case in FIG. 5, a reflective semi-cylinder masking the light source from an observer associated with reflective surfaces placed on only one side of the source ("underneath" the source, that is to say in the right-hand part of the figure in the case in FIG. 6b).

Figure 8:
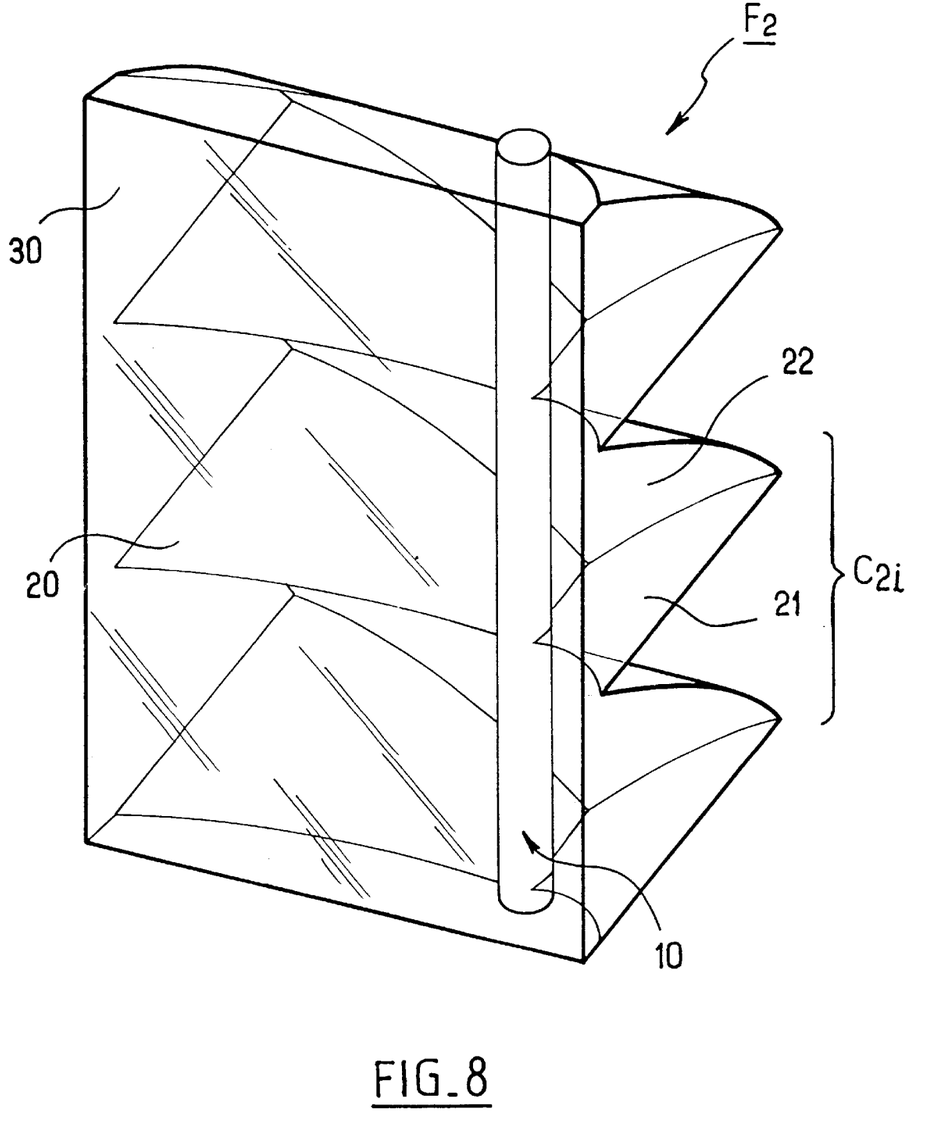
FIG. 8 is a schematic representation in perspective of a third variant embodiment of a light according to the invention.

In a variant embodiment of the invention depicted in FIG. 8, a light F2 is formed by the single-piece moulding of a transparent material having a refractive index greater than the index of the environment surrounding the light (this environment being in general air), around a light source 10.

In this case, the reflection of the light rays issuing from the source on the reflective surfaces 20, 21 and 22 of each cell results not from the coating of these surfaces with a reflective material but from the difference in indices between the inside and outside of the light combined with the orientation of the said reflective surfaces. The front face of the light, opposite to the reflective surfaces 20, 21 and 22, then consists of a plane separation surface 30 through which the light beam leaves the light after having been totally reflected by the surfaces 20, 21 and 22.

Figure 9:
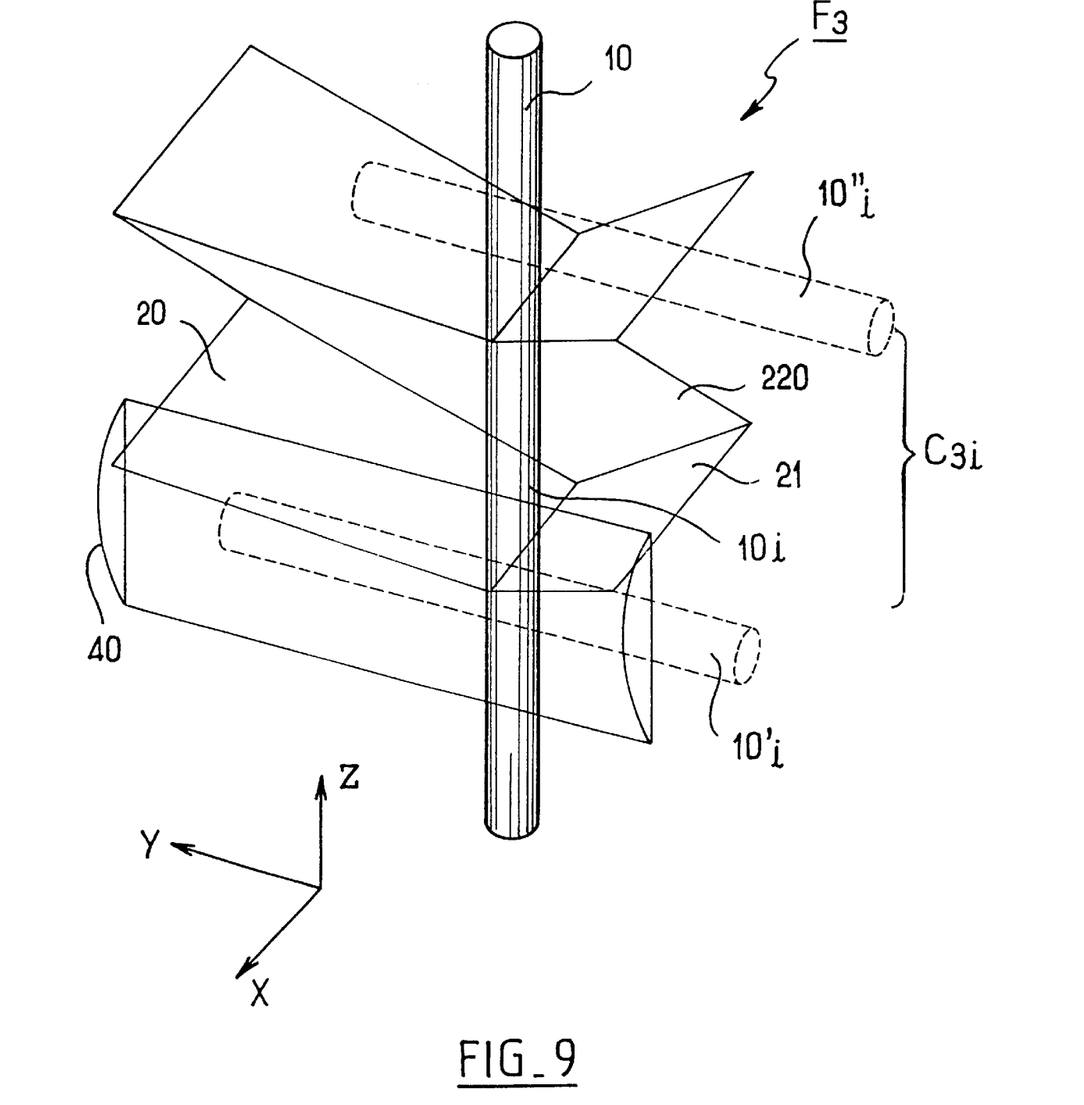
FIG. 9 is an outline diagram in perspective of a fourth variant embodiment of a light according to the invention.

FIG. 9 illustrates schematically another variant embodiment of the light in which plane reflectors 220 have been substituted for the cylindro-parabolic parts 22. Each plane reflector 220 forms, from the primary virtual source $10'_i$ (itself created from the light source portion $10_i$ by the plane mirrors 20 and 21) a secondary virtual source $10''_i$ parallel to the primary virtual source $10'_i$ and therefore horizontal. The radiation issuing from the cell $C_{3i}$ is thus equivalent to the radiation of an elongate light bar situated at the location of the secondary virtual source $10''_i$.

There is therefore provided in this case, in association with each cell $C_{3i}$, an optical element 40 for reflecting to infinity the secondary image $10''_i$ of the tube portion $10_i$ in a generally parallel beam. This element is for example a plano-convex cylindrical lens focused on the secondary virtual source $10''_i$.

Naturally, the different variant embodiments presented above can be implemented in combination with each other. In particular, it is possible to produce a "solid" system as depicted in FIG. 8, in which the cylindro-parabolic surfaces 22 have been replaced by plane mirrors 220, the elements for reflecting to infinity then being integrated into the exit separation surface 30.

It has been seen that it was possible according to the invention to recover most of the light flux from a rectilinear source with any orientation substantially different from a required beam spread direction (that is to say the transverse horizontal direction Y in the case of the above examples), in order to form a beam having the appearance of the beams in FIGS. 2a and 2b. It is of course also possible to implement the invention with a non-rectilinear elongate light source, the different optical cells of the light then being disposed so as to follow the geometry of the source.

Finally, it is in no way obligatory for the mirrors 20, 21 forming a primary virtual image to be strictly plane, as in the above examples; these mirrors can in fact be replaced by reflective surfaces with a different geometry, provided that they cooperate with the real source 10 in order to form virtual sources or virtual pseudo-sources able to cause, in cooperation with the reflective surface 22, a spread which is for the most part horizontal.

What is claimed is:

1. A motor vehicle indicator light comprising a light source of generally elongate shape, highly inclined with respect to a required principal beam spread direction, and a reflector in which the source is mounted, wherein the reflector comprises at least one mirror able to create, from a part of the source situated opposite it, a primary virtual light source substantially parallel to the required spread direction and means for concentrating the light radiation coming from the said primary virtual source in the vicinity of a plane containing the required beam spread direction.

2. The indicator light of claim 1, comprising a series of optical cells, each situated opposite a part of the light source, each cell comprising at least one mirror for creating a primary virtual light source substantially parallel to the required principal beam spread direction and means for concentrating the light radiation coming from the said primary virtual source in the vicinity of a plane containing the required beam spread direction.

3. The indicator light of claim 2, wherein the means for concentrating the light radiation coming from the primary virtual source of an optical cell lie overlapping, in a required direction of emission of the light, at least one mirror intended to create a primary virtual light source of the cell which is adjacent to it.

4. The indicator light of claim 1, comprising a reflective cover associated with the light source.

5. The indicator light of claim 1, wherein the reflector lies essentially on one side of the light source.

6. The indicator light of claim 1, wherein the light source is a low-pressure discharge tube, whose axis is separate from the vertical in a longitudinal vertical plane and/or in a transverse vertical plane.

7. The indicator light of claim 1, wherein the mirror or mirrors are disposed perpendicularly to the bisecting line of the axis of the part of the light source situated opposite the mirror or mirrors, and of an axis parallel to the required principal beam spread direction.

8. The indicator light of claim 1, wherein the concentration means comprise a part of a reflective surface in the form of a parabolic cylinder whose focal line coincides substantially with the axis of the primary virtual source.

9. The indicator light of claim 8, wherein the concentration means comprise, in continuity with the part of a reflective surface in the form of a parabolic cylinder, a reflective surface having substantially the geometry of a semi-paraboloid, the two reflective surfaces being in continuity with each other, the focal point of the semi-paraboloid corresponding substantially to one end of the primary virtual source.

10. The indicator light of claim 1, wherein the concentration means comprise an essentially flat reflective surface for creating, from the primary virtual source, a secondary virtual source which is parallel to it, and means for rectifying the radiation reflected by the said essentially flat reflective surface.

11. The indicator light of claim 1, wherein the reflective surfaces of the reflector consist of separation surfaces between a solid material in which the source is embedded and the environment external to the light, the refractive index of the material filling the light being greater than the refractive index of the environment external to the light and the face of the light through which the light radiation emerges from the light being defined by a separation surface.

12. The indicator light of claim 1, wherein the concentration means comprise an essentially flat reflective surface for creating, from the primary virtual source, a secondary virtual source which is parallel to it, and means for rectifying the radiation reflected by the said essentially flat reflective surface, wherein the reflective surfaces of the reflector consist of separation surfaces between a solid material in which the source is embedded and the environment external to the light, the refractive index of the material filling the light being greater than the refractive index of the environment external to the light and the face of the light through which the light radiation emerges from the light being defined by a separation surface, and wherein the means of rectifying the radiation are integrated into the separation surface.

13. The indicator light of claim 1, wherein the mirrors for forming a primary virtual source are plane.

14. The indicator light of claim 13, wherein the surfaces of the mirrors comprises means of spreading the light perpendicularly to the required principal beam spread direction.

15. The indicator light of claim 14, wherein the said spreading means are serrations which extend generally parallel to the required principal beam spread direction.

16. The indicator light of claim 1, wherein the mirrors for forming a primary virtual source are portions of a circular cylinder whose directrix extends parallel to the required principal beam spread direction.

17. The indicator light of claim 1, wherein the reflective surface is designed to produce a virtual light source without regard to the orientation of the actual light source.

18. The indicator light of claim 13, wherein the reflective surface is designed to produce a virtual light source without regard to the orientation of the actual light source.

* * * * *